(12) United States Patent
Barber

(10) Patent No.: US 7,478,839 B2
(45) Date of Patent: Jan. 20, 2009

(54) PENETRATION SLIDER SEAL EXPANSION JOINT APPARATUS AND METHOD

(75) Inventor: Neville Barber, San Diego, CA (US)

(73) Assignee: Expansion Joint Systems, Inc., Santee, CA (US)

( * ) Notice: Subject to any disclaimer, the term of this patent is extended or adjusted under 35 U.S.C. 154(b) by 422 days.

(21) Appl. No.: 11/284,745

(22) Filed: Nov. 21, 2005

(65) Prior Publication Data
US 2008/0012306 A1 Jan. 17, 2008

(51) Int. Cl.
F16L 27/00 (2006.01)
(52) U.S. Cl. .................. 285/281; 285/917; 277/603; 277/650
(58) Field of Classification Search .............. 277/603, 277/650; 285/139.2, 95, 108, 351, 352, 378, 285/917, 918, 379, 281
See application file for complete search history.

(56) References Cited

U.S. PATENT DOCUMENTS 4,428,592 A * 1/1984 Shaffer .................. 277/325
5,358,262 A * 10/1994 Roberts .................. 277/652
7,004,509 B2 * 2/2006 Beach et al. .............. 285/281
7,150,477 B2 * 12/2006 Reifschneider et al. ..... 285/281

* cited by examiner

Primary Examiner—Aaron M Dunwoody
(74) Attorney, Agent, or Firm—Dalina Law Group, P.C.

(57) ABSTRACT

An expansion joint lies between a device and pipe and allows for movement at the joint. Embodiments utilize a case pipe, a sliding ring formed to house seals, and a flange that holds the sliding ring in place. A pipe contacts an inner seal inside the sliding ring which is compressed against the pipe beyond its memory and forms a tight seal, yet allows for pipe to move through the apparatus. At least one outer seal is compressed within its memory which allows for rotation of pipe and/or sliding ring relative to the apparatus about the axis of the pipe. Allows for unlimited travel of pipe and unlimited rotation. The apparatus becomes more efficient as contaminants fill the seals. Works below, at and beyond 1300 degree media, for example any liquid or gas. May be disassembled easily maintained.

20 Claims, 15 Drawing Sheets

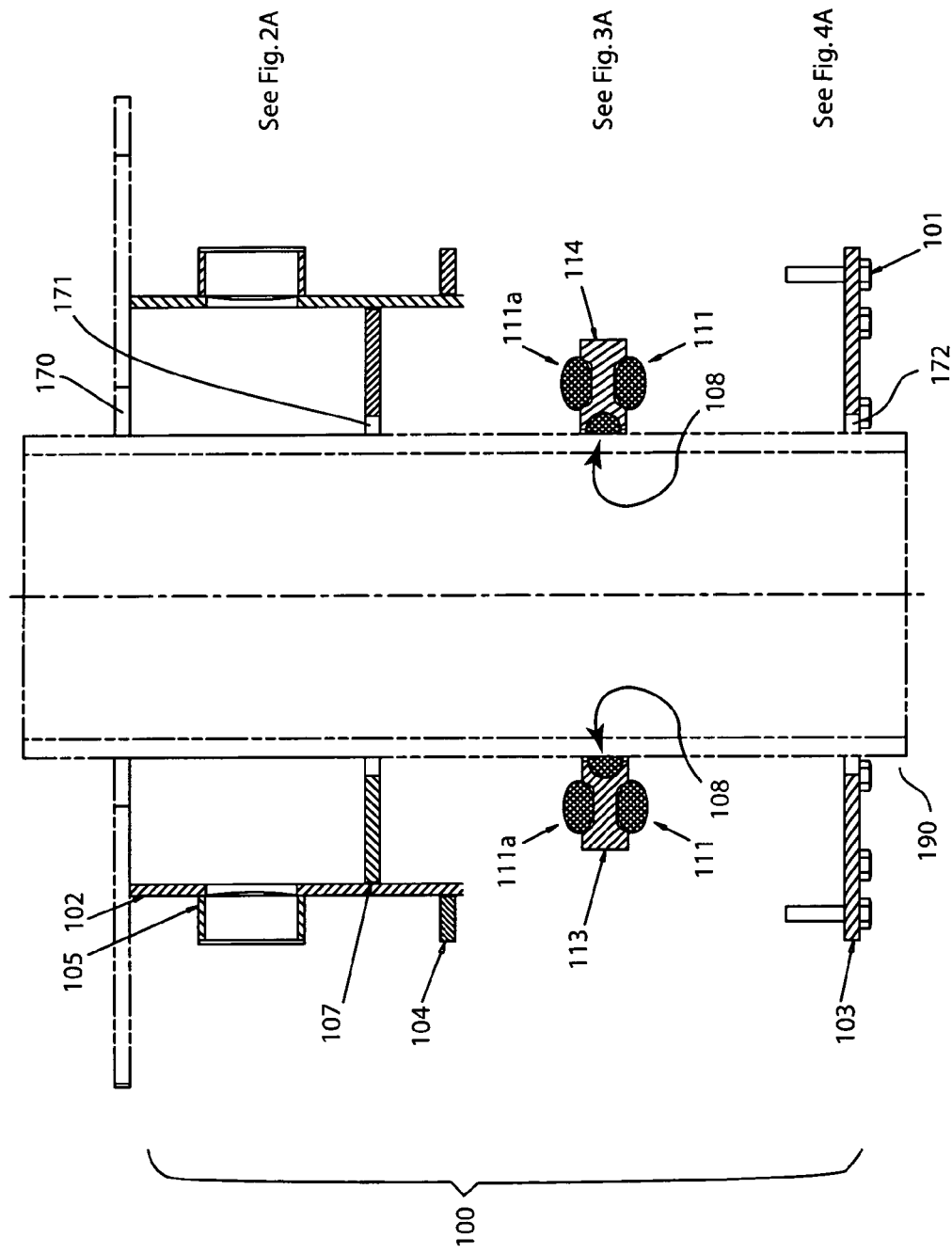

PENETRATION SLIDER SEAL EXPANSION JOINT APPARATUS AND METHOD

BACKGROUND OF THE INVENTION

1. Field of the Invention

Embodiments of the invention described herein pertain to the field of expansion joints. More particularly, but not by way of limitation, one or more embodiments of the invention enable an expansion joint of unlimited expansion and rotation of a pipe coupled to embodiments of the invention while maintaining containment integrity at the joint.

2. Description of the Related Art

There are a number of requirements and/or preferences associated with expansion joints. Expansion joints allow for the movement of a pipe with respect to a device to which the pipe is coupled and are required in some environments, for example power plants for safety and robust delivery of power. There are many other environments where expansion joints are used with pipe including commercial buildings, sewers and dams for example.

Current expansion joints do not allow for unlimited travel of pipe to and from a device and do not allow for unlimited rotation of a pipe with respect to a device. In addition, translational movement of pipe orthogonal to the axis of the pipe with respect to currently available expansion joints is also limited or non-existent depending on the particular joint.

Current expansion joint devices generally involve two types of mechanisms. The two main types of mechanisms used in expansion joints are bellows or a pipe traveling inside another pipe, (or use both methods combined for example). These joints are limited in the amount of travel of the pipe along the pipe axis, rotation about the pipe axis and translation orthogonal to the pipe axis that they can accommodate.

U.S. Pat. No. 3,976,312, to Murphree is an example of a bellows type expansion joint. The joint expands or contracts along the axis of the joint by stretching or compressing the bellows portion of the joint. The bellows must be thin enough to allow for stretching and compress, yet thick enough to withstand the internal pressure within the bellows at the temperature required for the installation. It is rare in the mechanical arts to combine flexibility and strength in one device and expansion joints are an example where this consideration is taken into account. In addition, bellows type expansion joints have a limited number of cycles that they are able to endure before failing. For example a bellows type expansion joint may be rated for 3,000 cycles and fail at 9,000 cycles. Maintenance of these types of joints generally involves cutting pipe and installing a new bellows type expansion joint. Maintenance of such an apparatus is thus an expensive endeavor.

U.S. Pat. No. 3,936,080 to Bennett is an example of a pipe-in-pipe expansion joint. Sleeve 30 fits inside sleeve 34 and allows for horizontal travel of sleeve 30 in and out of sleeve 34. This design makes use of two O-rings inside grooves 42 that are incapable of handling high pressure and/or temperature due to their configuration and materials of construction. Although better O-rings allow for higher temperature and pressure, in general, tightening the O-rings that here contact the pipe, results in less rotation and axial movement in the expansion joint. Translational movement orthogonal to the axis of the pipe is not possible with this type of expansion joint as there is no where for the inner sleeve to move to.

U.S. Pat. No. 4,526,409 to Schaefer is an example of an apparatus that uses both bellows and pipe-in-pipe elements. Sleeves 32 and 37 lie within bellows 12 and the sleeve 32 for example travels in and out of sleeve 37. This patent in effect makes use of both of the design element of the previous two patents described above. In addition, the device limits the length of travel of the two sleeves by employing stop members at the ends of the sleeves that limit the maximum amount of travel permitted by the device. This device suffers from the limitations of both of the previous devices in that the bellows are limited to a number of cycles and provide only limited horizontal travel without enabling unlimited rotation and provide negligible translation movement of the pipe to which the expansion joint is coupled.

For at least the limitations described above there is a need for a penetration slider seal expansion joint apparatus and method that allows for unlimited travel to and from the apparatus, unlimited rotation about the axis of the pipe and a configurable amount of translation movement orthogonal to the axis of the pipe to which the apparatus is coupled.

BRIEF SUMMARY OF THE INVENTION

One or more embodiments of the invention comprise a penetration slider seal expansion joint apparatus and method. An expansion joint is an apparatus that is situated between a device and a pipe and allows for expansion and contraction at the joint in order to account for movement of the pipe relative to the device. Expansion joints are used for example at power plants in order to couple boilers to steam pipes that are used to rotate generators. For example, power plants are configured to operate using steam at approximately 1300 degrees and 700 PSI. Boiler exhaust systems operate at this temperature, but at much lower pressure, generally around one atmosphere. Boiler exhaust systems may also employ expansion joints. By utilizing an expansion joint at the boiler, ruptures in the joints between the boiler and pipes are avoided for example during earth quakes or due to thermal expansion or as a result of any other force which may occur at the joint. Expansion joints thus ensure the safe and continuous operation of the power plant.

Embodiments of the invention may be used in power plant exhaust systems for example. Embodiments of the invention are constructed from a case pipe comprising an inner ring, a sliding ring formed to house a plurality of seals, and a flange that couples with the case pipe to hold the sliding ring in place. These three main elements are described further in the detailed description and accompanying figures below. Utilizing this configuration provides numerous advantages. Embodiments of the invention allow limited leakage but provide unlimited travel of the pipe along the axis of the apparatus, unlimited rotation of the pipe about the axis of the pipe, a configurable amount of translational movement orthogonal to the axis of the pipe, and a configurable amount of angular deviation (the amount of angle differing from the axis of the pipe with respect to the device to which it attaches). The amount of translational movement allowed orthogonal to the axis of the pipe is controlled by the size of the gaps employed in the case pipe and flange as will be further described below. Embodiments of the invention allow for ease of maintenance since the apparatus may be disassembled and worked on without cutting metal or welds. In addition, embodiments of the invention may be constructed in any size. Embodiments of the invention may also be configured in series and/or recursively stacked to provide a level of redundancy heretofore unobtainable.

Embodiments of the invention are configured to provide contact between an inner seal that is inside the sliding ring and a pipe. The inner seal is compressed between the sliding ring and the pipe beyond its memory (roughly over 25% compressed depending on the material used for the inner seal) and forms a tight seal against the pipe, but allows for the pipe to travel along the axis of the pipe. By "beyond its memory" it is meant that the seal is compressed enough to take set to the shape that it is compressed to wherein the seal will not return to its original shape when uncompressed. At least one outer seal is compressed within its memory (roughly under 25% compressed depending on the material used for the out seal) which allows for rotation of pipe and/or sliding ring relative to the apparatus about the axis of the pipe. By "within its memory" it is meant that the seal will return to its original shape after any compressive force is released. By compressing the outer seal(s) within memory, the seal(s) expand back to their uncompressed volume after receiving a compressive force.

Various materials may be utilized for the seals. In one or more embodiments of the invention, the seals are made of braided metallic wire, for example 309 stainless steel. Although porous, seals made from this type of material comprise memory that allows for the inner and outer seals to perform properly and in addition fill with contaminants as time passes which actually improves the seals by allowing less matter to escape past the seals. Depending upon the environment in which the embodiment is used, rubber seals, silicon seals, seals comprising ceramic, fiberglass and/or metallic materials may be substituted or used in combination in keeping with the spirit of the invention. By utilizing an inner seal beyond memory and at least one outer seal within memory, unlimited travel and rotation is achieved, with configurable translation and angular deviation and minimal leakage. Maintaining the seals is easily achieved without cutting welds.

Embodiments of the invention utilize an upper and lower outer seal to allow for the pipe to readily move along its axis and rotate about it axis and also to provide a shock absorbing component that takes effect until the coefficient of static friction is overcome on the inner seal with respect to the pipe. Use of two outer seals provides for give and take in each direction of inward and outward pipe movement.

Translational movement is enabled by either utilizing internal insulation or other seals or bumpers between the sliding ring and case pipe to limit the translational movement. The gaps to the inner ring or flange providing the maximum translational movement orthogonal to the axis of the pipe and the gaps may be configured depending on the particular installation environment. Insulating materials or a side seal may or bumpers be employed in order to provide limits to the translational travel that are smaller than the gaps at the case pipe and flange. This prevents the pipe from contacting the apparatus at the inner ring gap or flange gap for example. The angular deviation allowed by the apparatus is configured by altering the thickness of the sliding ring, diameter of chamber formed by the inner ring and flange and the thickness of the outer seals in addition to the gaps at the case pipe and flange as will be explained in the detailed description below.

BRIEF DESCRIPTION OF THE DRAWINGS

The above and other aspects, features and advantages of the invention will be more apparent from the following more particular description thereof, presented in conjunction with the following drawings wherein:

FIG. 1E is an exploded side cross section view of FIG. 1B of an embodiment of the penetration slider seal expansion joint assembly.

DETAILED DESCRIPTION

A penetration slider seal expansion joint apparatus and method will now be described. In the following exemplary description numerous specific details are set forth in order to provide a more thorough understanding of embodiments of the invention. It will be apparent, however, to an artisan of ordinary skill that the present invention may be practiced without incorporating all aspects of the specific details described herein. In other instances, specific features, quantities, or measurements well known to those of ordinary skill in the art have not been described in detail so as not to obscure the invention. Readers should note that although examples of the invention are set forth herein, the claims, and the full scope of any equivalents, are what define the metes and bounds of the invention.

Figure 1:
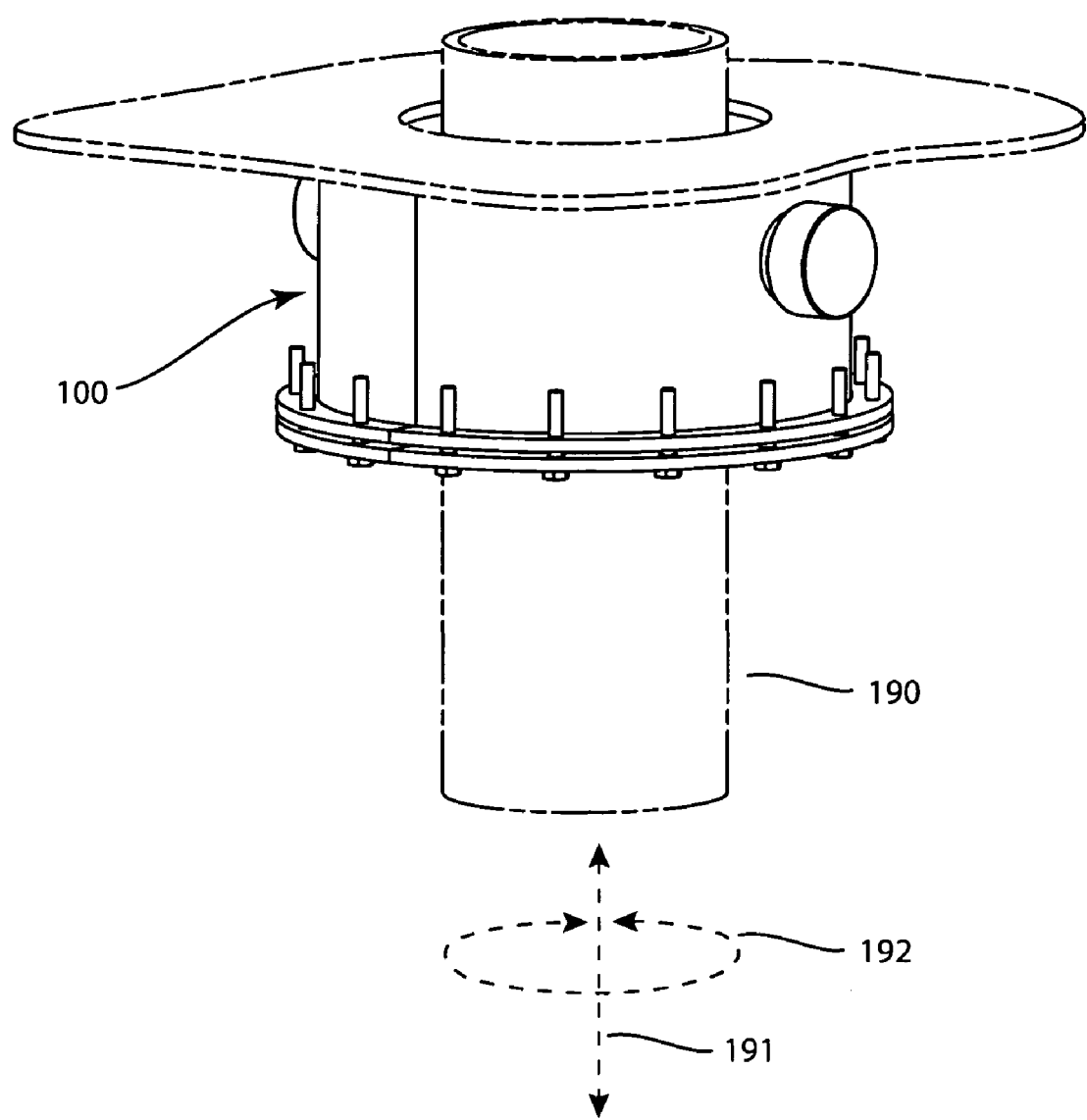
FIG. 1 is an isometric view of an embodiment of the penetration slider seal expansion joint assembly.

FIG. 1 is an isometric view of an embodiment of the penetration slider seal expansion joint 100. Pipe 190 may travel in an unlimited direction along pipe axis 191. Pipe 190 may rotate in an unlimited angle 192 about pipe axis 191. Pipe 190 may be of any size so long as penetration slider seal expansion joint 100 is sized to fit pipe 190. For example, pipe 190 may be up to or larger than 5 meters in diameter. Translational movement capabilities are described in relation to FIG. 1E below.

Figure 1A:
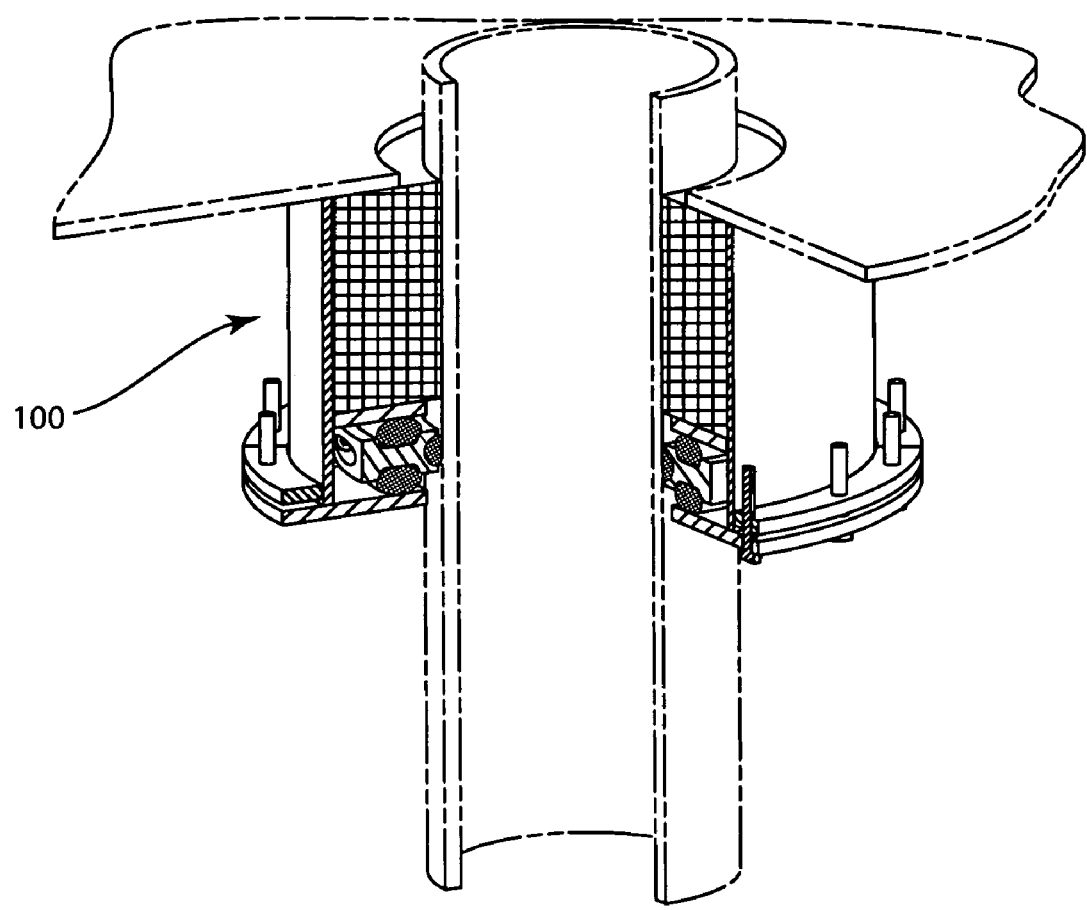
FIG. 1A is an isometric cross section view of an embodiment of the penetration slider seal expansion joint assembly broken along the sections defined in FIG. 1D.
Figure 1B:
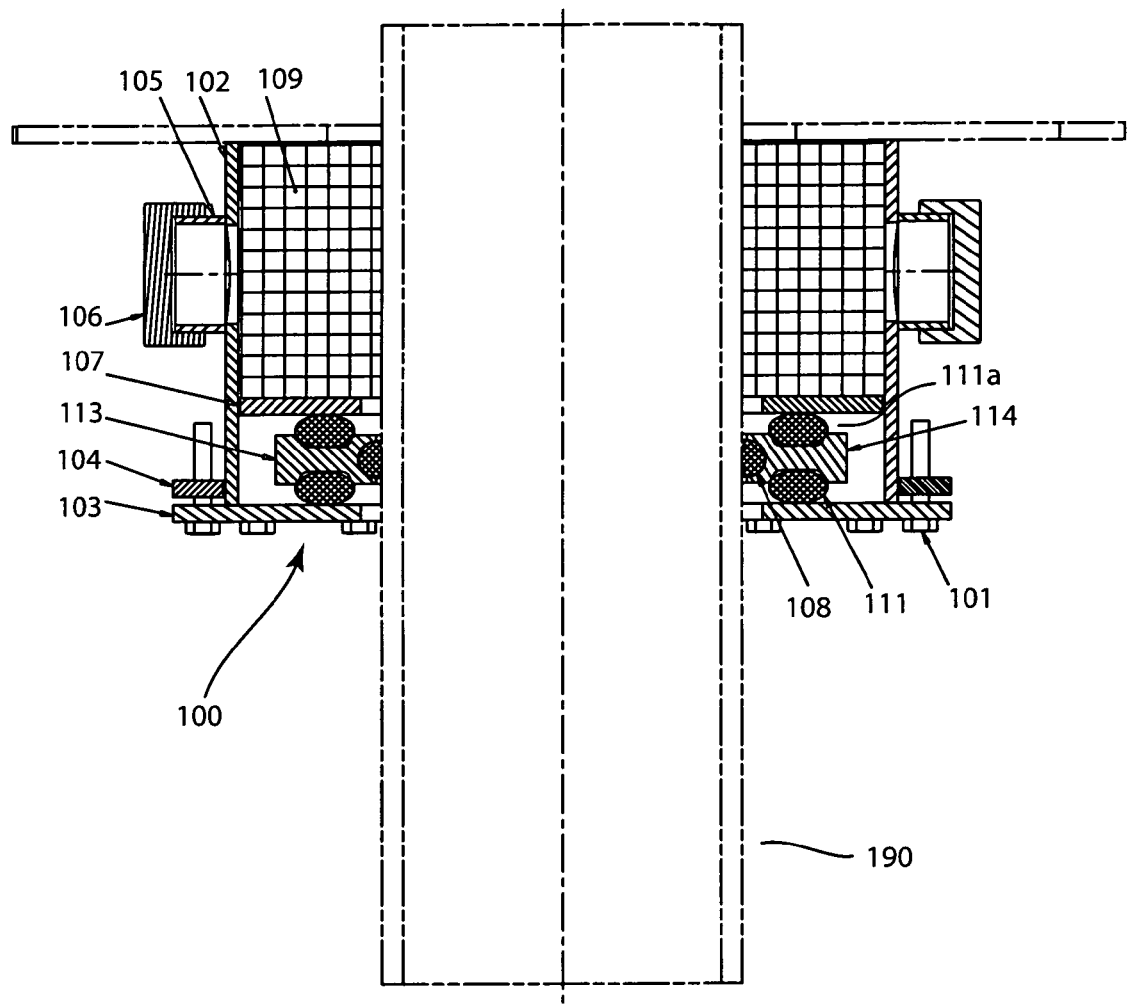
FIG. 1B is a side cross section view of an embodiment of the penetration slider seal expansion joint assembly broken along the sections defined in FIG. 1D.
Figure 1C:
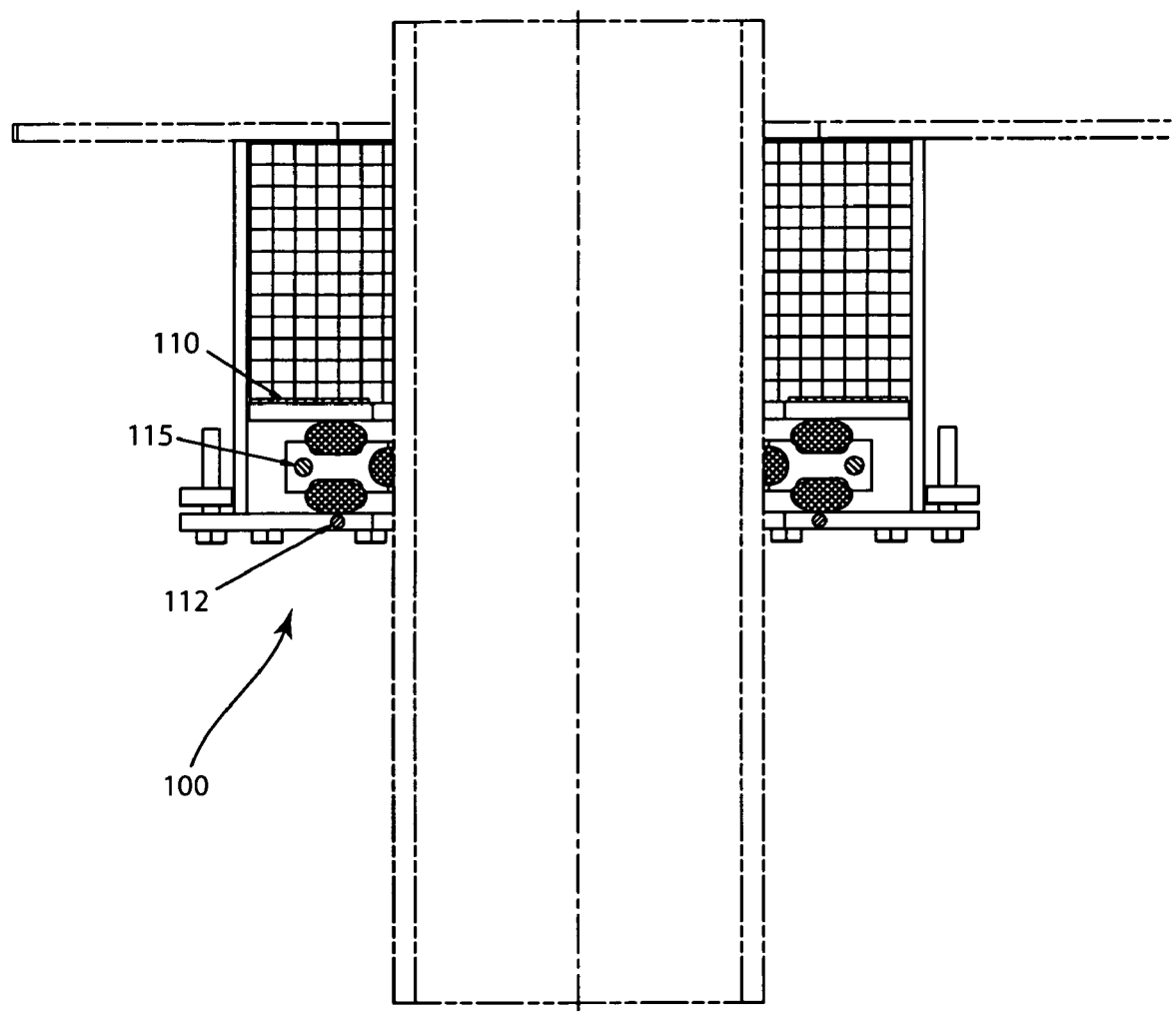
FIG. 1C is a side cross section view of an embodiment of the penetration slider seal expansion joint assembly broken along the sections defined in FIG. 1D.
Figure 1D:
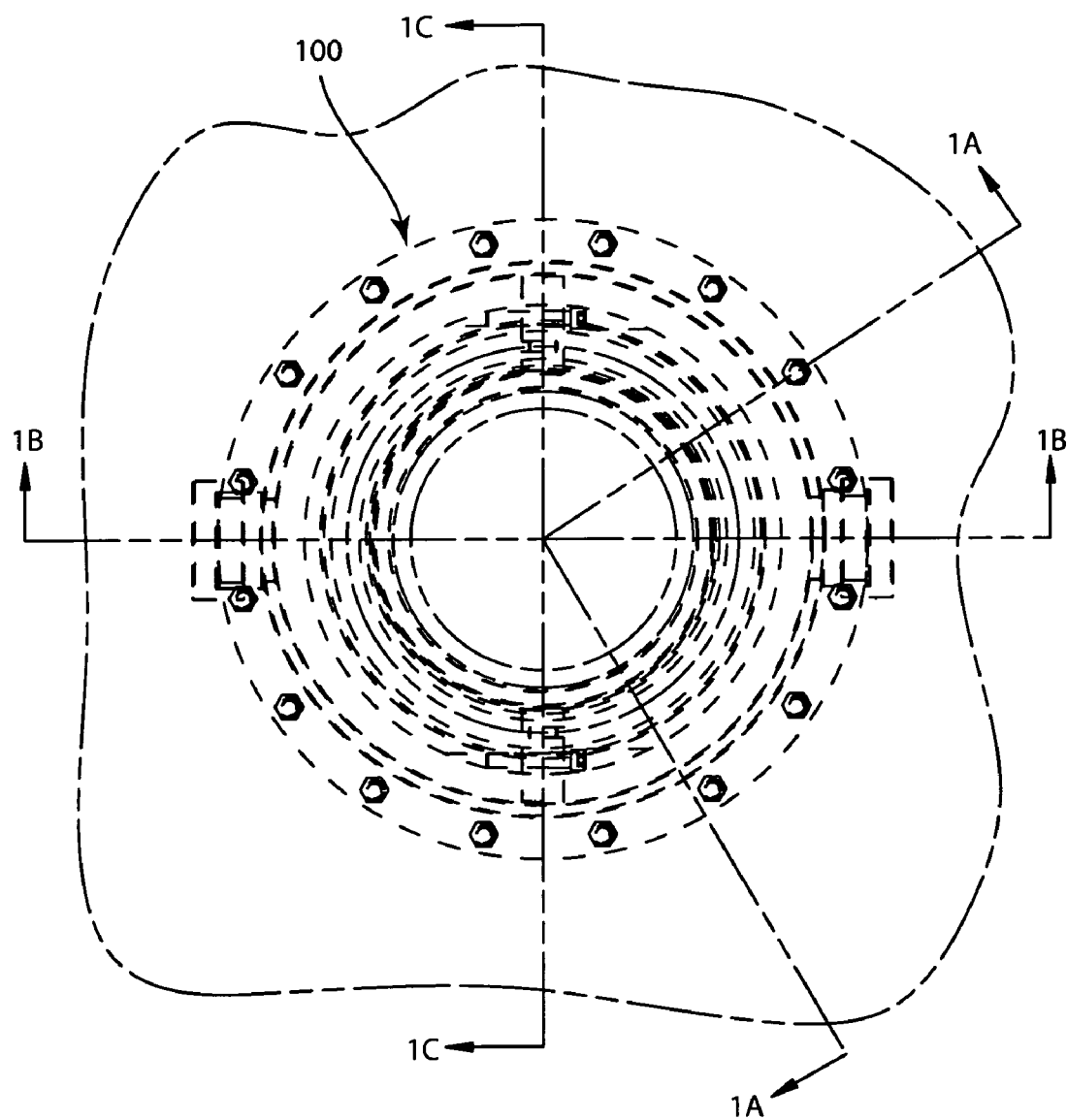
FIG. 1D is a top view of an embodiment of the penetration slider seal expansion joint assembly showing cross section viewing figure numbers for FIGS. 1A-1C.

FIG. 1A is an isometric cross section view of an embodiment of the penetration slider seal expansion joint assembly broken along the sections defined in FIG. 1D. FIG. 1B is a side cross section view of an embodiment of the penetration slider seal expansion joint assembly broken along the sections defined in FIG. 1D. Embodiments of the invention are comprised of case pipe 102, (which may be formed of two pieces for ease of installation) comprising inner ring 107, sliding ring half 113 and sliding ring half 114 formed to house inner seal 108 and outer seal 111, and flange 103 that couples with case pipe 102 (via flange ring 104) to hold the sliding ring (formed from sliding ring half 113 and sliding ring half 114) in place. Utilizing this configuration provides numerous advantages. Embodiments of the invention allow for unlimited travel of the pipe along the axis of the apparatus and unlimited rotation of the pipe about the axis of the pipe (see FIG. 1). Embodiments of the invention allow for ease of maintenance since the apparatus may be disassembled and worked on without cutting metal or welds. Bolt 101 (of which any number may be utilized as one skilled in the art will recognize) or any other coupling method may be utilized in coupling flange 103 to the flange ring 104 of case pipe 102. Any type of bolt 101 may be utilized so long as the bolt specifications are within the desired operating environmental parameters, bolts may be galvanized or plated or constructed from a material that can withstand the heat and force required for the particular application as one skilled in the art will recognize. In one or more embodiments of the invention B7 grade bolts constructed from high strength carbon alloy steel may be utilized for high temperature applications.

By coupling flange 103 to flange ring 104, sliding ring half 113 and sliding ring half 114 are housed within penetration slider seal expansion joint 100. Insulation 109 provides insulation between the environment within the pipe and the external environment on the outside of the apparatus. Insulation 109 for example may comprise Durablanket® S insulation which is a strong, lightweight, flexible needled blanket that is made from spun ceramic fibers and rated to a recommended operating temperature of 2150 degrees F. with a maximum operating temperature of 2300 degrees F. Any other insulation may be used depending upon the configuration and operating environment. Insulation 109 may further be used as a translational direction limiting element in keeping the pipe from contacting flange 103 or inner ring 107. Optional pipe nipple 105 and pipe cap 106 allow for opening and closing the apparatus to observe the internal status of the insulation and/or to couple with external elements such as temperature and/or pressure transducers for example. Any other device may be coupled with pipe nipple 105 by unscrewing pipe cap 106 and couple the desired device to pipe nipple 105. Flange 103, flange ring 104, inner ring 107, sliding ring half 113 and 114 may be constructed for example from high strength plate of the desired thickness and hardness based on the operating environment in which the apparatus is deployed.

Figure 1F:
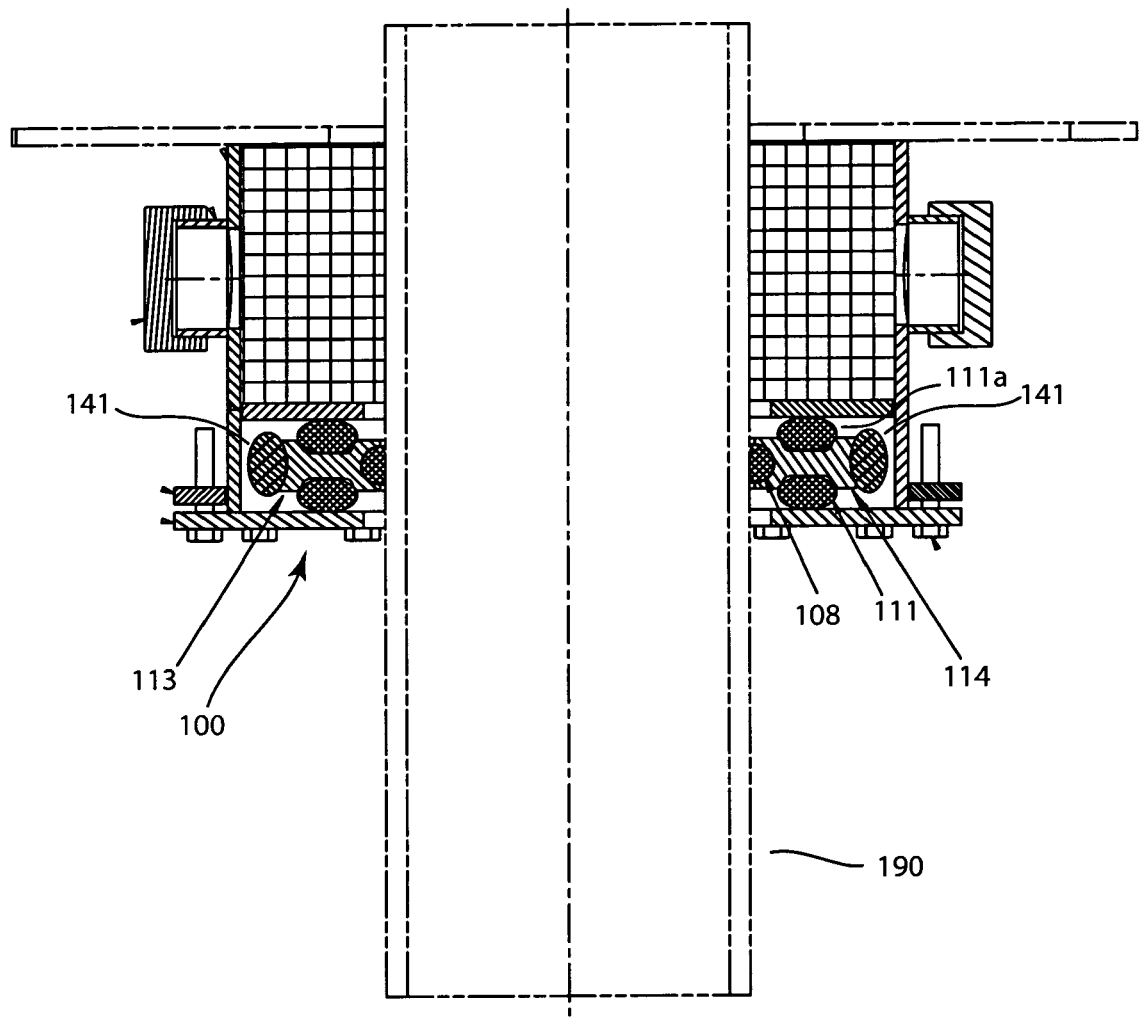
FIG. 1F is the side cross section view of FIG. 1B showing optional side seal/bumper/roller.

Embodiments of the invention are configured to provide contact between pipe 190 and inner seal 108 that is configured to reside between sliding ring formed by sliding ring half 113 and sliding ring half 114. Inner seal 108 is compressed between the sliding ring formed from sliding ring half 113 and sliding ring half 114 and pipe 190 beyond its memory (roughly over 25% compressed) and forms a tight seal against pipe 190. The seal however allows for pipe 190 to travel along the axis of the pipe (see FIG. 1). At least one outer seal 111 (and/or 111a) is compressed within its memory (generally under 25% compressed) which allows for rotation of pipe 190 and/or sliding ring relative to apparatus 100 about the axis of the pipe (see FIG. 1). By compressing outer seal(s) 111 and/or 111a within memory, the seal(s) expand back to their uncompressed volume after receiving a compressive force. One or more embodiments of the invention utilize upper outer seal 111a and lower outer seal 111 to allow for pipe 190 to readily rotate and to provide a shock absorbing component that takes effect until the coefficient of static friction is overcome on inner seal 108 with respect to pipe 190. Element 111a may be substituted for a bumper or roller that does not act as a seal in keeping with the spirit of the invention. Alternatively element 111 may be substituted for a bumper or roller while element 111a is a seal. As long as one of the elements, either 111 or 111a, is a seal that is compressed within its memory, the matter being retained within the apparatus will not escape. FIG. 1F is the side cross section view of FIG. 1B showing optional side seal/bumper/roller 141. Element 141 may be a side seal of the same type as the inner seal or the outer seal, or alternatively may comprise a bumper that has no sealing attributes. In another embodiment of the invention, element 141 may comprise a roller. In any of these embodiments element 141 provides for limiting the maximum translational movement of pipe 190 and may provide for movement up to or less than gaps at the flange or inner ring.

FIG. 1C is a side cross section view of an embodiment of the penetration slider seal expansion joint assembly broken along the sections defined in FIG. 1D. Lap plate 110 (also shown in FIG. 2B) allows for correct alignment of case pipe 102 when it is formed from two pieces. Cap screw 115 couples sliding ring half 113 to sliding ring half 114. The sliding ring may be formed of one or more portions so long as the sliding ring is capable of compressing the inner seal against the pipe with enough force to prevent matter such as gas or liquid from bypassing the seal formed between the inner seal and the pipe. Although no seal is perfect, the amount of matter allowed to escape from the seal may be minimized by employing enough force on the inner seal and outer seal(s) to provide the required efficiency of the deployment. Pin 112 allows for flange 103 to be formed from two halves for example. Flange 103 may be formed from one or more elements so long as flange 103 is capable of containing sliding ring within the volume formed by flange 103 and inner ring 107 (see FIG. 1B). Although FIG. 1C shows elements that allow for an embodiment of the invention to be built from half pieces, this figure is exemplary only and any of the referenced elements may comprise one or any greater number of parts in keeping with the spirit of the invention.

FIG. 1D is a top view of an embodiment of the penetration slider seal expansion joint assembly showing cross section viewing figure numbers for FIGS. 1A-1C. FIG. 1E is a side cross section exploded view of an embodiment of the penetration slider seal expansion joint assembly shown in FIG. 1B. Embodiments of the invention employ gaps between the pipe and the inner ring 107 of case pipe 102 and flange 103 that allow for translational movement of the pipe orthogonal to the axis of the pipe. Device gap 170 may be any size that allows for pipe 190 to be coupled within the apparatus. Device gap 170 is associated with the device that the expansion joint is coupled with and may for example be a boiler exhaust plate or return. Inner ring gap 171 and flange gap 172 may be any size of overall diameter that is larger than pipe 190. Inner ring gap 171 and flange gap 172 allow for translational movement of pipe 190 orthogonal to pipe axis 191 (see FIG. 1). Insulation 109 (see FIG. 1B) or a roller, bumper or side seal on the opposing side of the sliding ring with respect to inner seal 108 may be employed in order to provide limits to the translational travel that are equal to or smaller than inner ring gap 171 and flange gap 172. This prevents pipe 190 from contacting apparatus 100 at inner ring 107 of case pipe 102 or flange 103 for example. The distance along the pipe between gap 171 and 172 (assuming gap 170 to be large enough) allows for an angular deviation of pipe 190 with respect to the orthogonal axis defined by the pipe in the figure. For example, gaps 171 and 172 are small relative to the distance between inner ring 107 and flange 103 when the apparatus is tightened down, then the angular deviation allowed by the pipe will be small. If gaps 171 and 172 are large relative to the distance between inner ring 107 and flange 103 then a great deal of angular deviation in the pipe is allowed with respect to the orthogonal configuration of the pipe as shown. These limitations assume that the sliding ring halves 113 and 114 do not contact inner ring 107 and flange 103 when the pipe deviates from the orthogonal. This is the case if outer seals 111 and 111a are thick with respect to the distance from pipe 190 to the outermost edge of sliding ring 114 for example. In this configuration the sliding ring will not impinge upon inner ring 107 or flange 103 when the pipe deviates from the orthogonal. If the outer seals are relatively small then the outer edge of the sliding ring will impinge upon inner ring 107 (and flange 103 on the opposing side of the pipe) and that will limit the angular deviation. The tradeoff between larger outer seals and angular deviation is measured against the amount of leakage permitted and design limits of the pipe entering the apparatus when configuring for angular deviation. The exact size of seal, sliding ring and gaps to utilize for a desired translational and angular deviation configuration are easily calculated by substituting in thinner and thinner seals until the proper angular deviation configuration is achieved. The insertion of alternate seal sizes is accomplished by unscrewing the bolts holding the flange and uncoupling the sliding ring halves and inserting different thickness outer seals. This capability of manually adjusting for angular deviation has never before existed with expansion joints.

In embodiments of the invention that employ porous seals, over time, the apparatus becomes more efficient as contaminants fill the seals, which in one or more embodiments of the invention are constructed from braided metallic wires. Example power plant installations are configured to operate with 1300 degree exhaust gas at roughly 1 atmosphere of pressure, and under this operating environment seals that do not melt such as braided metallic seals are employed. Note also that as shown the outer seals are elliptical in shape, however this is exemplary and other configurations with more circular or flatter configurations are also desirable depending upon the amount of leakage that is permitted with embodiment having flatter seals generally allowing for less angular deviation, but greater leakage preventing capabilities. FIG. 1H is an embodiment of the invention utilizing a different shape of outer seal 111, in this case more circular (except for example where outer seal 111 presses against the inner ring). By making the sliding ring small and employing narrower outer seals, the outer diameter of the apparatus is hence minimized which is a design factor in some applications.

Figure 1G:
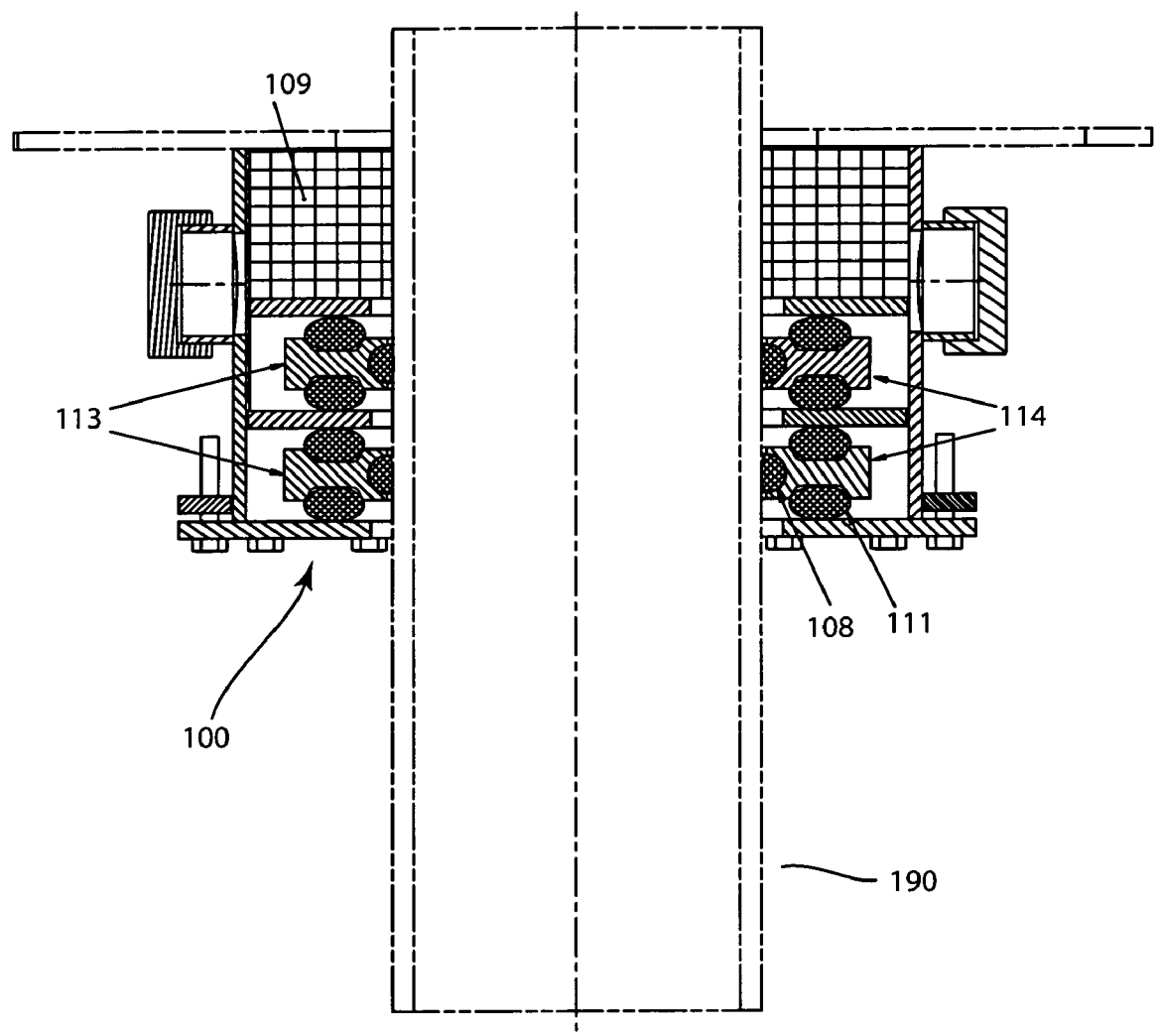
FIG. 1G is an embodiment utilizing two stacked sliding rings.
Figure 1H:
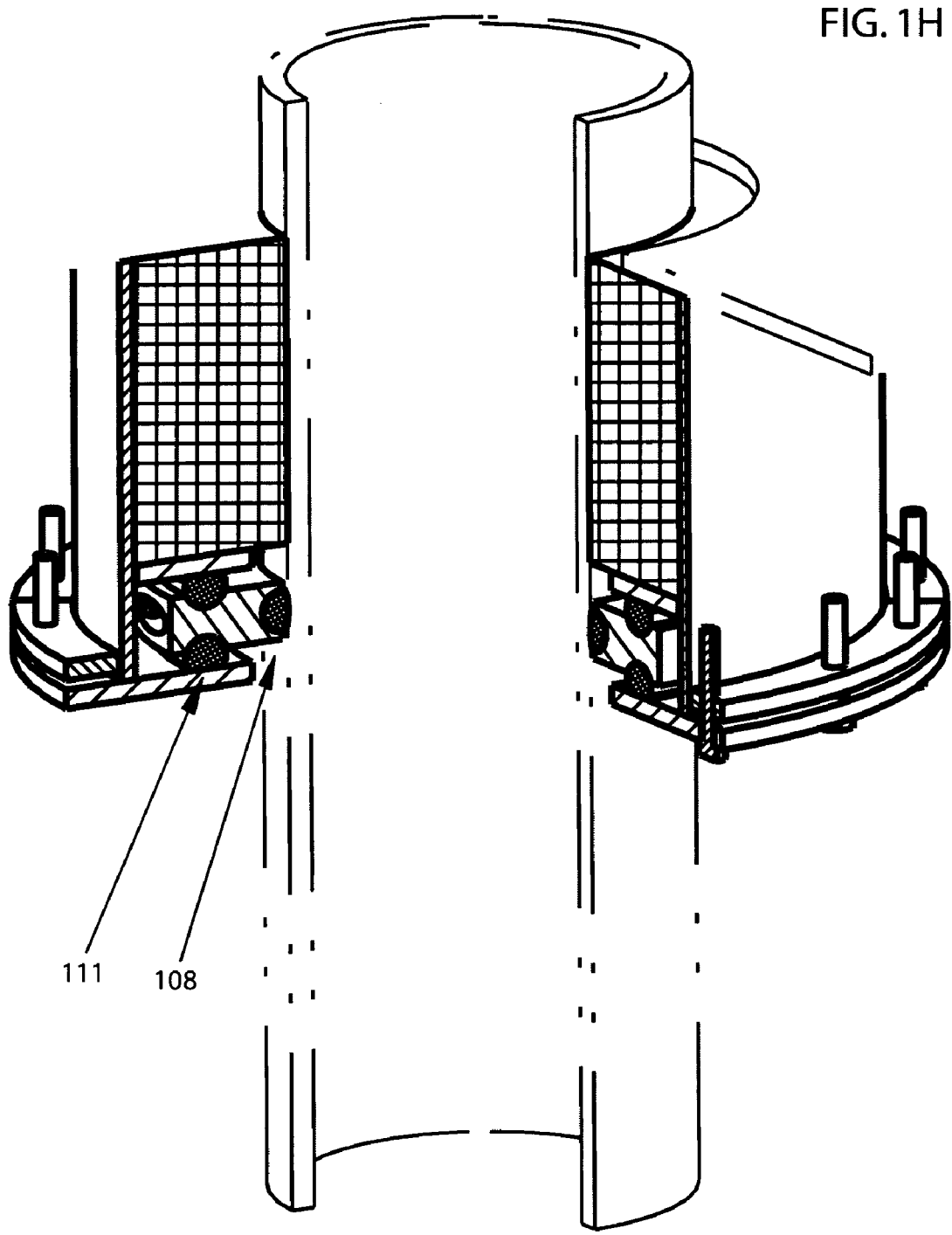
FIG. 1H is an embodiment of the invention utilizing a different shape of outer rings, e.g., more circular.

FIG. 1G is an embodiment utilizing two stacked sliding rings in series. Sliding ring half 113 and sliding ring half 114 are doubled to provide to sliding rings offset from one another along the axis of the pipe. An alternative configuration to this is a recursive configuration wherein an entire embodiment is situated within another embodiment to provide a double embodiment. Any number of embodiments may be used in series as shown or recursively in keeping with the spirit of the invention.

Figure 2A:
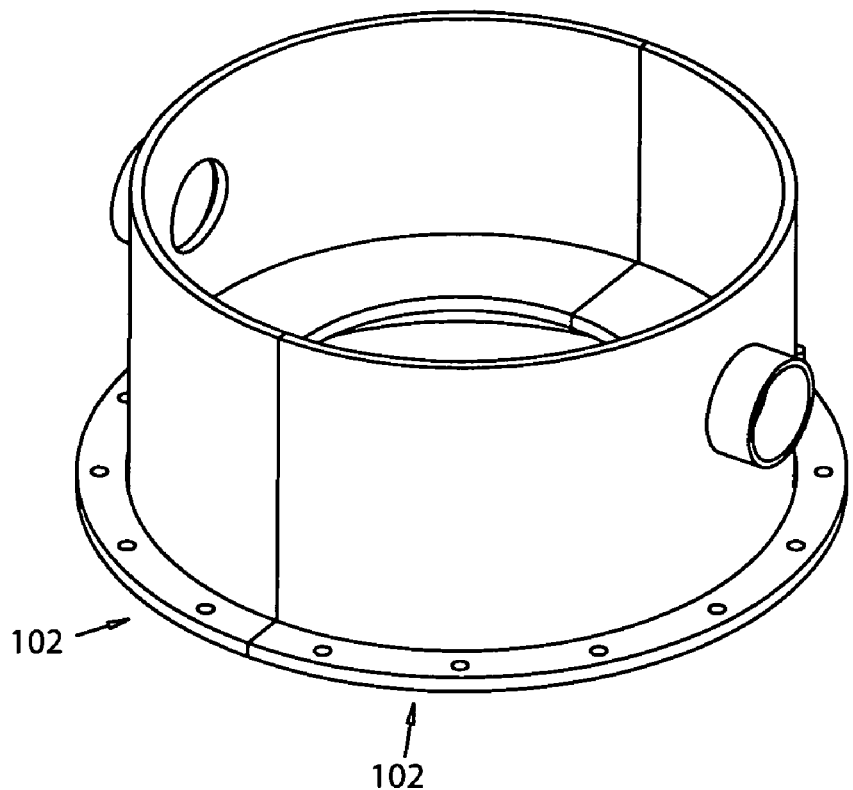
FIG. 2A is an isometric view of an embodiment of two case pipe half elements assembled together.
Figure 2B:
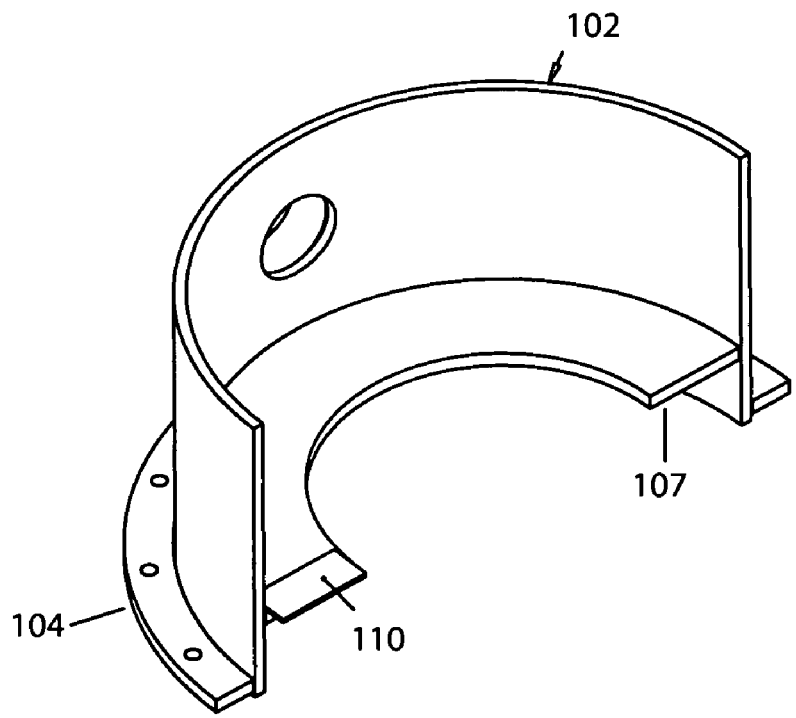
FIG. 2B is an isometric view of an embodiment of one case pipe half element.

FIG. 2A is an isometric view of an embodiment of two case pipe half elements assembled together. Note that there is no requirement that case pipe 102 be constructed from halves. In the case of construction from one piece, case pipe 102 does not require lap plate 110 as seen in FIG. 2B, which is an isometric view of an embodiment of one case pipe half element. For existing installations, utilizing a case pipe that is constructed from two pieces allows for easy installation of case pipe 102 around an existing pipe.

Figure 2C:
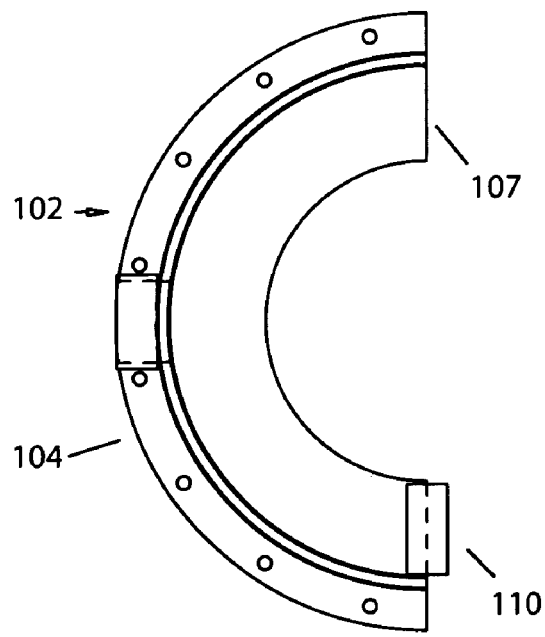
FIG. 2C is a top view of an embodiment of one case pipe half element.
Figure 2D:
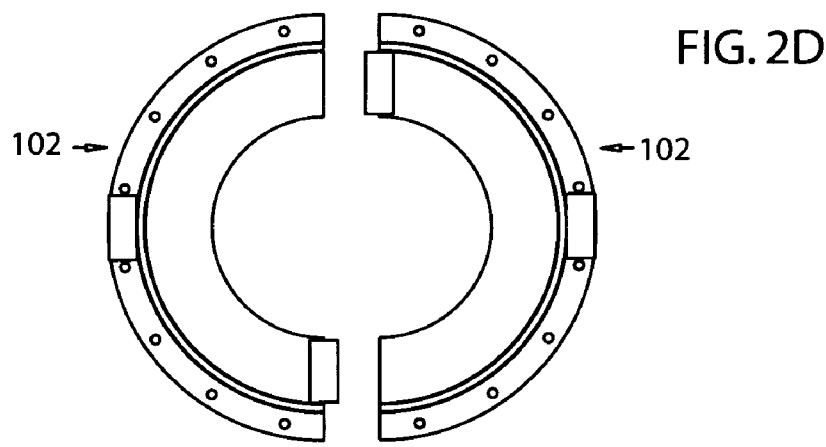
FIG. 2D is a top view of an embodiment of two case pipe half elements separated from one another.
Figure 2E:
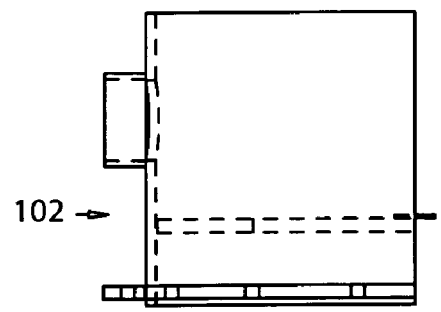
FIG. 2E is a side view of an embodiment of one case pipe half element.

FIG. 2C is a top view of an embodiment of one case pipe half element. FIG. 2D is a top view of an embodiment of two case pipe half elements separated from one another. FIG. 2E is a side view of an embodiment of one case pipe half element. There is no limitation as to the size of flange ring 104. Flange ring 104 may also couple with flange 103 in any other method beside the use of bolts as one skilled in the art will recognize.

Figure 2F:
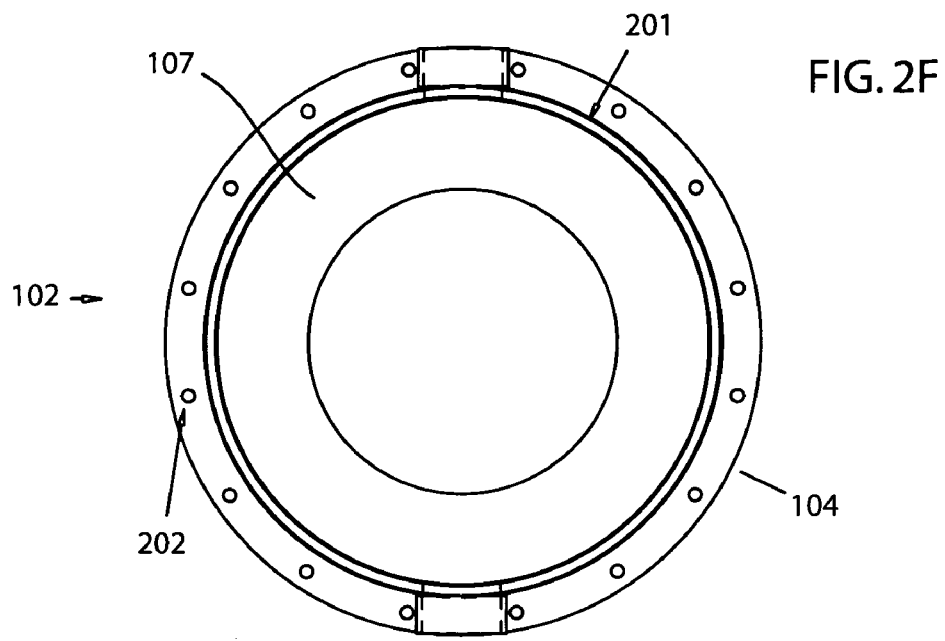
FIG. 2F is a top view of an embodiment of a case pipe.
Figure 2G:
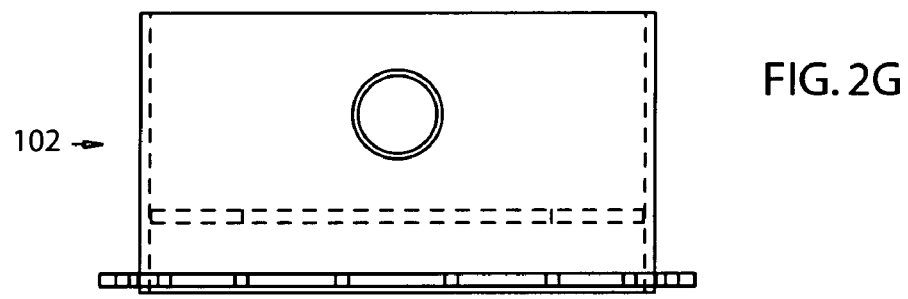
FIG. 2G is a front view of an embodiment of a case pipe.
Figure 2H:
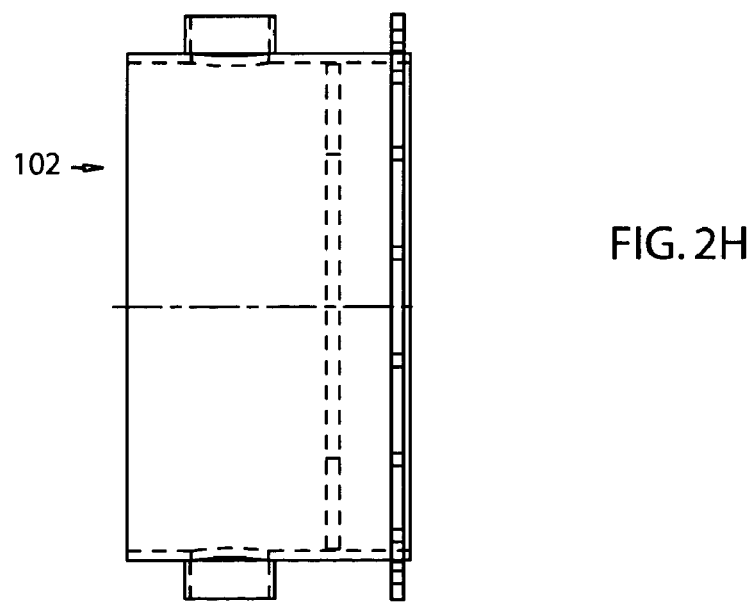
FIG. 2H is a side view of an embodiment of a case pipe.

FIG. 2F is a top view of an embodiment a case pipe. Case pipe wall 201 may be of any thickness sufficient to withstand the pressure internal to the device to which the apparatus is coupled. Inner ring 107 may be of any size sufficient to hold sliding ring half 113 and 114 and provide enough clearance for a pipe to couple with the apparatus. FIG. 2G is a front view of an embodiment of a case pipe. FIG. 2H is a side view of an embodiment of a case pipe. As shown in FIGS. 2F-2H case pipe 102 is constructed from one piece. As shown in FIGS. 2C-2E case pipe is constructed from two halves. There is no limit to the number of pieces that may be utilized in forming the case pipe and although one and two piece embodiments are shown herein, this is exemplary and is not a limiting feature of the apparatus as one skilled in the art will recognize.

Figure 3A:
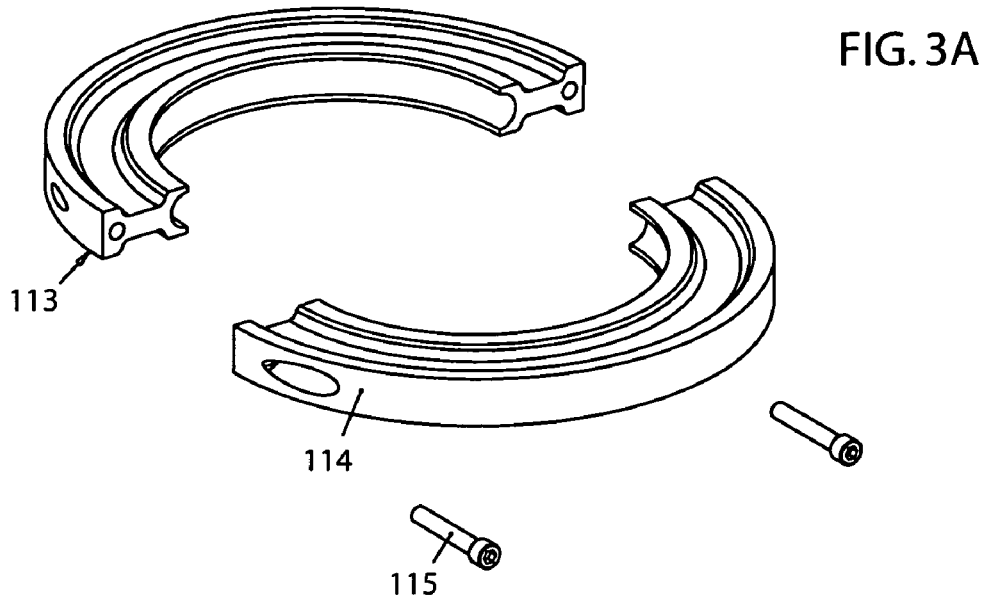
FIG. 3A is an isometric view of an embodiment of two sliding ring halves separated from one another.
Figure 3B:
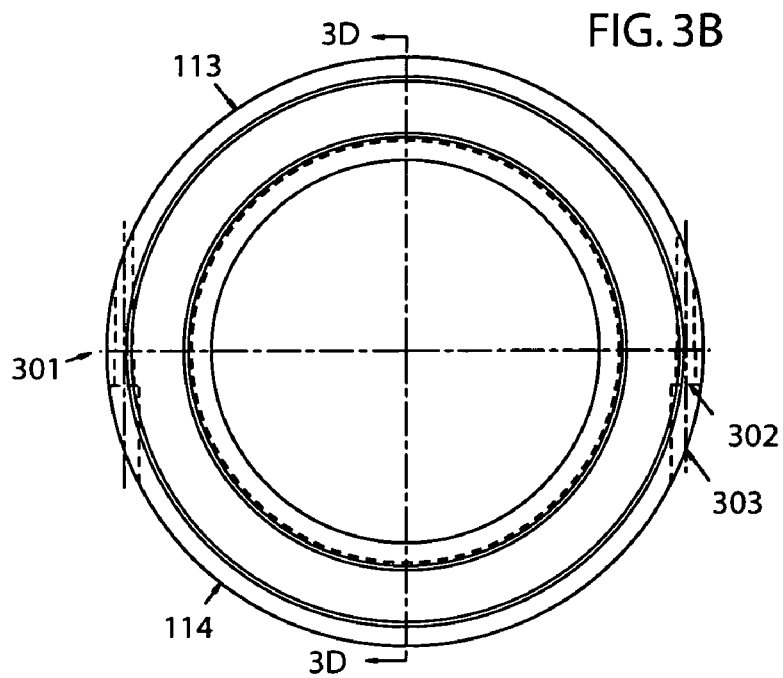
FIG. 3B is a top view of an embodiment of two sliding ring halves assembled together.
Figure 3D:
FIG. 3D is a cross section view of an embodiment of two sliding ring halves assembled together and broken along the section defined in FIG. 3B.
Figure 3C:
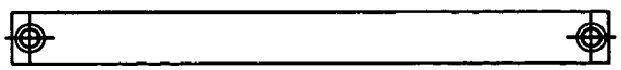
FIG. 3C is a front view of an embodiment of two sliding ring halves assembled together.

FIG. 3A is an isometric view of an embodiment of two sliding ring halves 113 and 114 separated from one another. In one embodiment of the invention the sliding ring is formed from one piece. In the embodiment shown, the sliding ring is formed from two halves. There is no limit to the number of pieces that may be utilized in forming the sliding ring. Cap screw 115 is used in coupling sliding ring half 113 to sliding ring half 114. FIG. 3B is a top view of an embodiment of two sliding ring halves assembled together. Joint 301 is held together by cap screws 115 entering along axis 303 to a depth as shown by 302. Any other method of coupling sliding ring half 113 to sliding ring half 114 is in keeping with the spirit of the invention. FIG. 3C is a front view of an embodiment of two sliding ring halves assembled together. FIG. 3D is a cross section view of an embodiment of sliding ring half 113 and sliding ring half 114 assembled together and broken along the section defined in FIG. 3B.

Figure 4A:
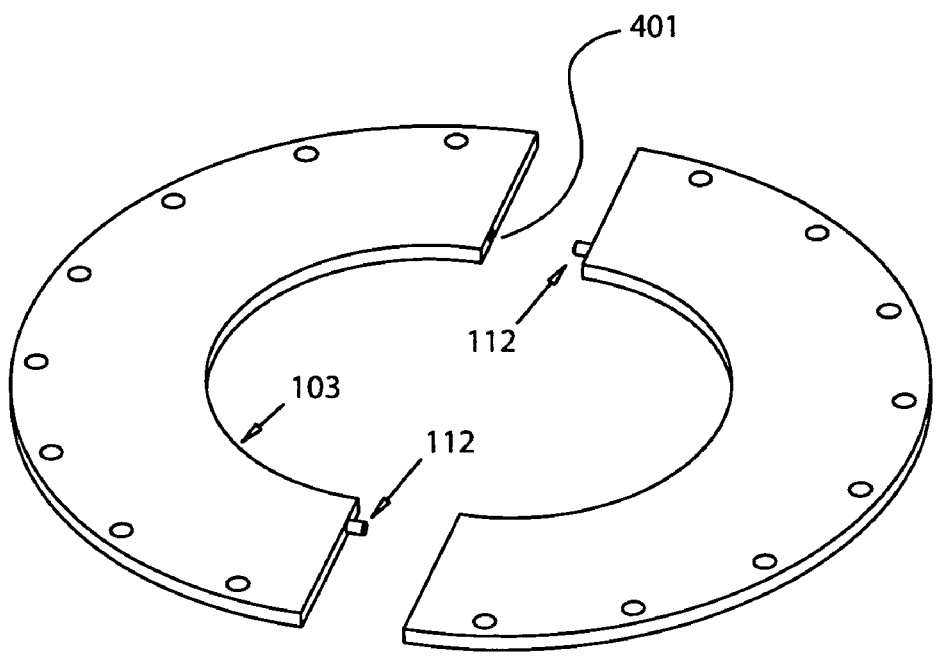
FIG. 4A is an isometric view of an embodiment of two flange elements separated from one another.
Figure 4B:
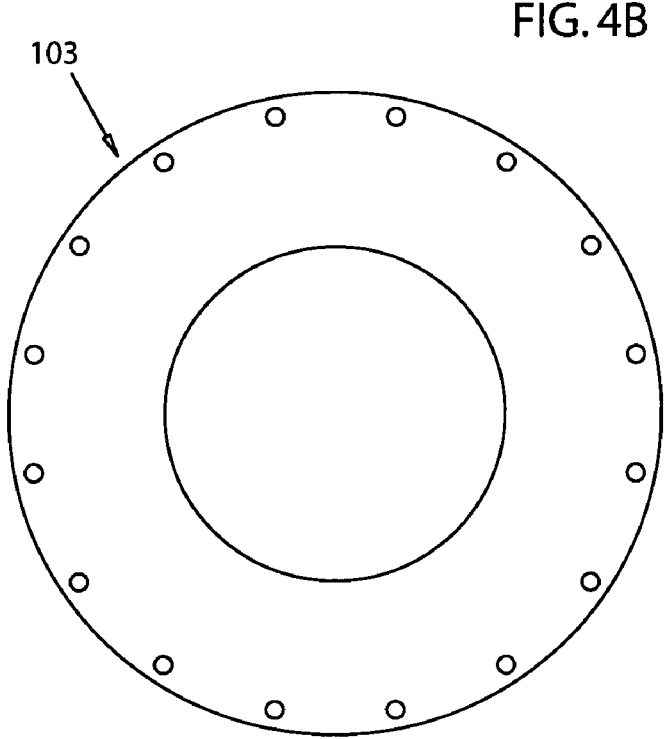
FIG. 4B is a top view of an embodiment of two flange elements assembled together.
Figure 4C:
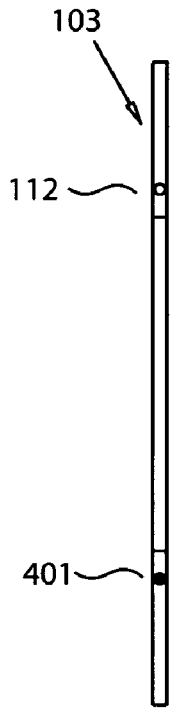
FIG. 4C is a side view of an embodiment of a flange element.

FIG. 4A is an isometric view of an embodiment of two flange elements separated from one another. Pin 112 allows for flange pieces 103 to couple with one another when each pin 112 enters respective hole 401. Flange 103 may be constructed from any number of components. Generally, each element of the system may be formed from two pieces for ease of installation; however this is not a limitation of the apparatus. FIG. 4B is a top view of an embodiment of two flange elements assembled together. FIG. 4C is a side view of an embodiment of a flange element.

Figure 5:
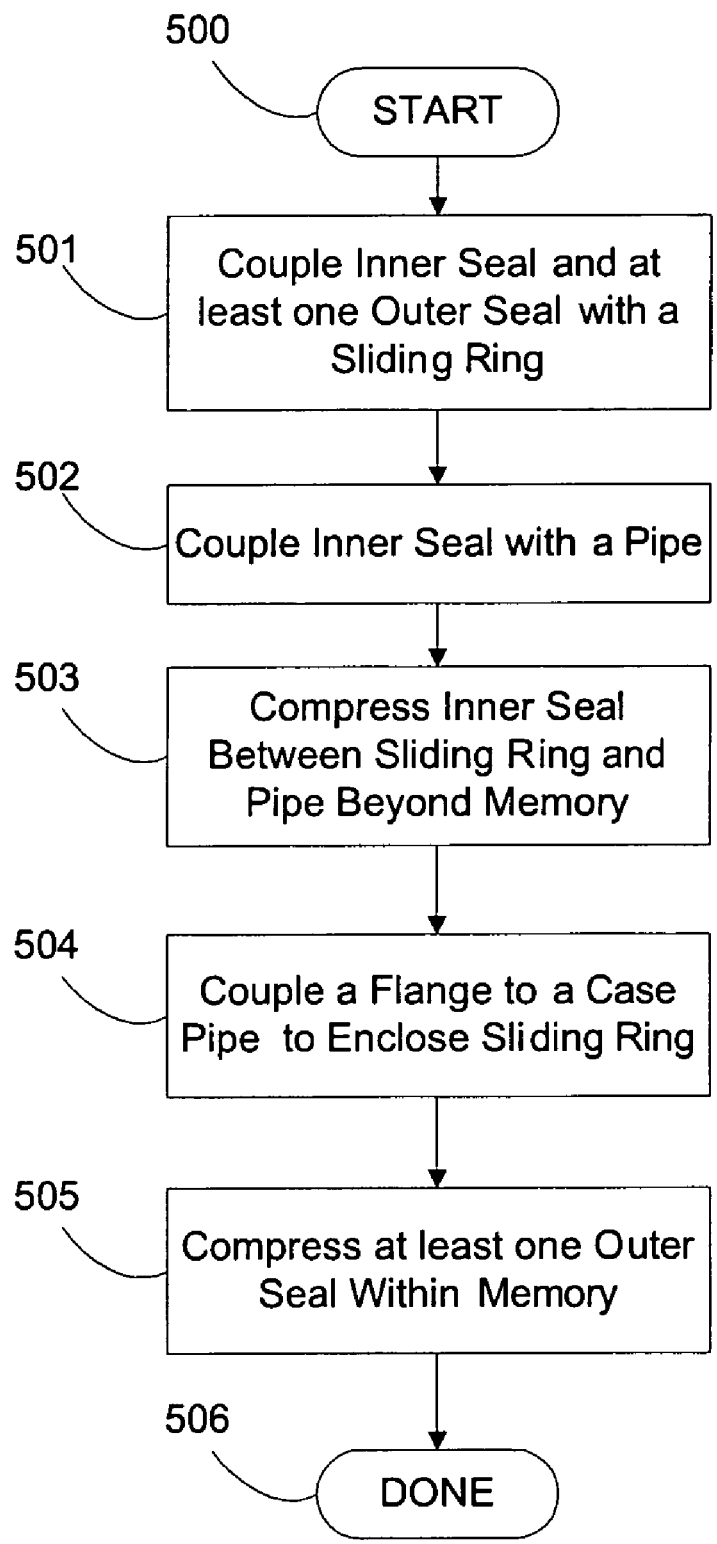
FIG. 5 is a flowchart detailing a method of utilizing a penetration slider seal expansion joint assembly.

FIG. 5 is a flowchart detailing a method of utilizing a penetration slider seal expansion joint assembly. Processing starts at 500. An inner seal and at least one outer seal are coupled with a sliding ring at 501. In one embodiment of the invention, two outer seals are employed, an upper outer seal and a lower outer seal. The inner seal is coupled with a pipe at 502. The inner seal is compressed beyond memory at 503 to form a tight seal between the sliding ring and the pipe at 503. The flange is coupled to the case pipe to enclose the sliding ring (and associated seals) at 504. At least one of the outer seals is compressed within memory at 505. This allows for the outer seal(s) to retain their shape after they are compressed in one direction or the other (towards the flange ring or flange as per FIG. 1B). The apparatus thus configured allows for unlimited pipe travel along the axis of the pipe and unlimited rotation about the axis of the pipe. Furthermore, gaps in the flange for example allow for translational movement of the pipe orthogonal to the axis of the pipe.

While the invention herein disclosed has been described by means of specific embodiments and applications thereof, numerous modifications and variations could be made thereto by those skilled in the art without departing from the scope of the invention set forth in the claims.

What is claimed is:

1. A penetration slider seal expansion joint comprising:
   a case pipe;
   an inner ring coupled with said case pipe;
   a sliding ring configured to hold an inner seal and at least one outer seal;
   a flange configured to hold said sliding ring and said inner seal and said at least one outer seal against said inner ring;
   said inner seal compressed beyond memory against a pipe; and,
   said at least one outer seal compressed within memory.

2. The apparatus of claim 1 wherein said inner seal is formed from braided metallic wire.

3. The apparatus of claim 1 wherein said inner seal allows less matter to escape as said inner seal fills with contaminants.

4. The apparatus of claim 1 wherein said at least one outer seal is formed from braided metallic wire.

5. The apparatus of claim 1 wherein said at least one outer seal allows less matter to escape as said at least one outer seals fills with contaminants.

6. The apparatus of claim 1 wherein said at least one outer seal is compressed within memory against at least one planar surface orthogonal to an axis parallel to said pipe.

7. The apparatus of claim 6 wherein said at least one planar surface orthogonal to said axis parallel to said pipe is a flange.

8. The apparatus of claim 6 wherein said at least one planar surface orthogonal to said axis parallel to said pipe is a flange ring.

9. The apparatus of claim 6 wherein said at least one planar surface orthogonal to said axis parallel to said pipe is a flange and flange ring.

10. The apparatus of claim 1 wherein said case pipe is formed from two halves.

11. The apparatus of claim 1 wherein said sliding ring is formed from two halves.

12. The apparatus of claim 1 wherein said flange is formed from two halves.

13. The apparatus of claim 1 further comprising:
    insulation configured between a case pipe wall and said pipe.

14. The apparatus of claim 1 further comprising:
    a inner ring gap between said inner ring and said pipe.

15. The apparatus of claim 1 further comprising:
    a flange gap between said flange and said pipe.

16. A method for utilizing a penetration slider seal expansion joint comprising:
    coupling an inner seal and at least one outer seal with a sliding ring;
    coupling an inner seal with a pipe;
    compressing said inner seal between said sliding ring and said pipe wherein said inner seal is compressed beyond memory;
    coupling a flange to a case pipe to enclose said sliding ring; and,
    compressing said at least one outer seal within memory.

17. The method of claim 16 further comprising:
    forming said inner seal from braided metallic wire.

18. The method of claim 16 further comprising:
    decreasing the amount of matter that escapes via said inner seal by filling said inner seal with contaminants.

19. The method of claim 16 further comprising:
    forming said at least one outer seal from braided metallic wire.

20. The method of claim 16 further comprising:
    decreasing the amount of matter that escapes via said at least one outer seal by filling said at least one outer seal with contaminants.

* * * * *